R. N. EVANS.
ANTISKID CHAIN.
APPLICATION FILED JUNE 28, 1910.
979,141.
Patented Dec. 20, 1910.
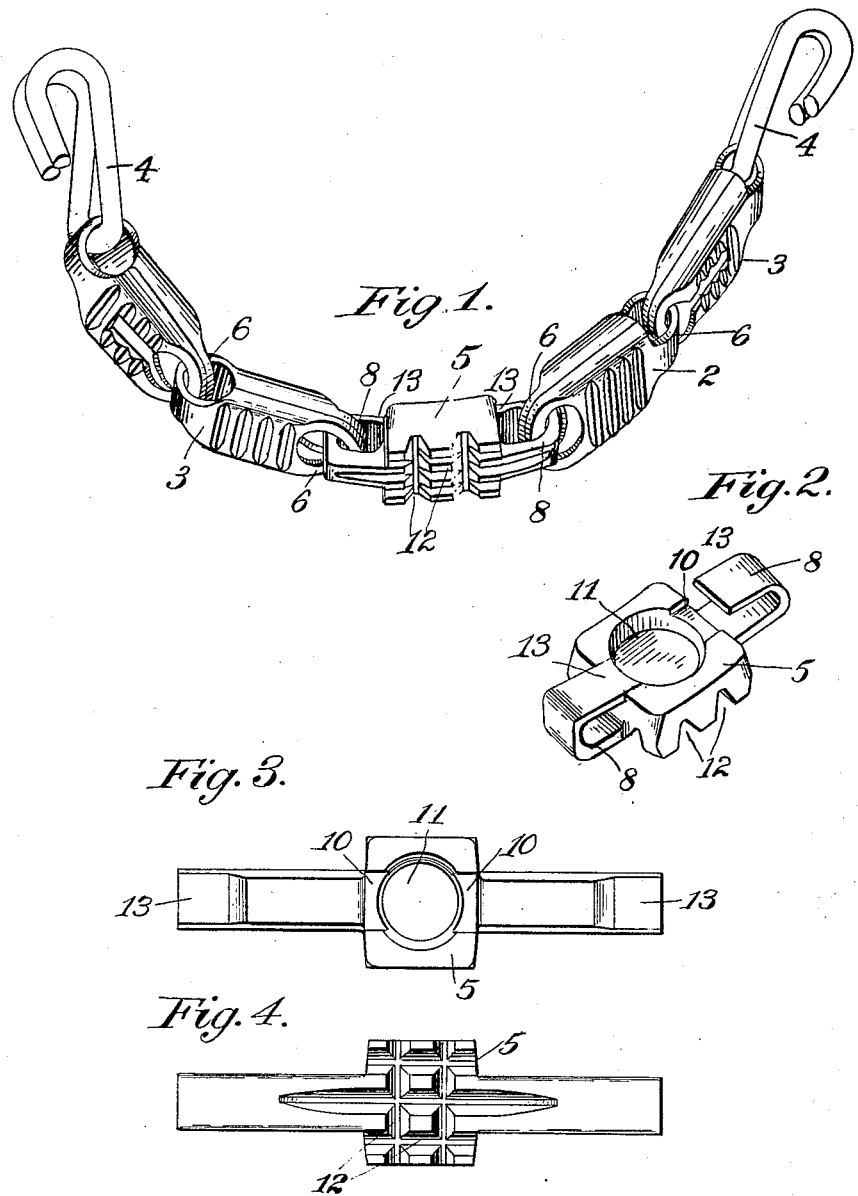

UNITED STATES PATENT OFFICE.

ROBERT N. EVANS, OF NEW YORK, N. Y., ASSIGNOR TO ATLAS CHAIN COMPANY, OF BROOKLYN, NEW YORK, A CORPORATION OF NEW YORK.

ANTISKID-CHAIN.

979,141.  Specification of Letters Patent.  Patented Dec. 20, 1910.

Application filed June 28, 1910. Serial No. 569,310.

*To all whom it may concern:*

Be it known that I, ROBERT N. EVANS, a citizen of the United States, residing at New York, borough of Brooklyn, in the county of Kings and State of New York, have invented certain new and useful Improvements in Antiskid-Chains, of which the following is a specification.

This invention relates to anti-skid devices for motor vehicle tires, and more particularly to tire chains, and particularly to cross members thereof made up of articulated links, the present improvement relating especially to the center link of the cross member, the object of the invention being to provide an improved middle or center link of block or solid formation and so constructed that the articulation of a pair of adjacent links may be readily accomplished without the necessity of opening or otherwise specially constructing such adjacent links in any different manner from other links of the cross member to permit connection thereof with a block link.

Heretofore when my company used a block link in connection with adjacent side links of box form it has been necessary to form the loop portions of such adjacent links in some special manner to permit the articulation of the block link therewith. To avoid this disadvantage is the object of the present improvement.

In the drawings accompanying and forming part of this specification, Figure 1 is a perspective view of a cross member of an anti-skid tire chain made up of box links and this improved block link; Fig. 2 is a perspective rear view of the block link; Fig. 3 is a plan rear view of the block link with the side connecting members unbent; and Fig. 4 is a plan face view of the same link.

Similar characters of reference indicate corresponding parts throughout the figures of the drawings.

The tire chain is usually made up of a series of cross members each of which, as 2, may comprise a plurality of box-formed links 3 having means, such as hooks 4, for connecting the cross member to the side chains of the anti-skid chain. In the present instance the cross member is shown comprising four box-links, two at each side of the block link 5, which is in position to connect two pair of box links together to form the cross member. In the present improvement the two box links adjacent to the block link are provided with loop or eye portions 6 which are of integral construction. The block link 5 in the present instance comprises a thickened body or central portion having relatively great width and breadth, and shown herein as substantially the same breadth and width, provided with a pair of extensions or projections 7 bent to form a pair of loops 8, each adapted to be inserted into one of the loop or eye portions of an adjacent box link, after which the free ends of these extensions are united with the body at the rear side of the block link each being countersunk into a recess 10 adapted to receive the free end of its extension so that the end of the extension will be flush with the rear wall of the block link and thus present a smooth surface to the tire. Each end of the extensions is so united with the body, as by brazing, soldering or welding, that it, to all intents and purposes, forms an integral structure therewith. Thus it will be observed that the block link may be connected to its adjacent box links without the necessity of splitting or otherwise specially forming the loops of such box links to permit such connection so that each such link thus has its loop formed in one unbroken or unsevered piece with the body thereof.

In practice the block link is curved or formed concaved at its rear side to conform to the tread surface of the tire and is also provided with an opening 11 forming what may be designated as a suction chamber at the rear side of the block link. The face or tread surface of the block link is formed with a series of intersecting grooves 12 forming projections, thereby to provide a roughened surface which will effectively engage the roadway and materially assist in preventing the slippage of the chains on the roadway and the skidding of the vehicle. In the construction shown these grooves are also located in the face of the extensions projecting at each side of the block link. The united ends of the extensions are formed of less thickness, as shown at 13, than the major portion of the body of such extensions since there is no wear on this part of the link, this not only reducing the weight but facilitating the proper joining of the extensions to the rear side of the block link, while providing a thickened portion at the front or wearing side of the extension.

By forming the block link of considerable width, and of a width greater than the box links, I am able to obtain a considerable tread surface centrally of the tire upon the road, and also to obtain considerable protection to the tire itself, since as the cross chains are located relatively close together it follows that by making the block formed links of greater width than the box formed links a greater surface of the tire is protected, as well as a greater tread surface on the road obtained, so that the box links may be made comparatively small, as the larger proportion of the wear comes upon the block links. But, aside from these advantages, by making the block link of considerable width, and of greater width than the box links, it prevents the turning over of the chain on the tire in use. In other words, the rolling of the chain and the turning over thereof upon the tire is prevented, since as the block links are of considerable width they project beyond the plane of the sides of the box links and act to prevent the turning over of the chain upon the tire.

I claim as my invention:

A cross member for an anti-skid tire chain, comprising a plurality of articulated box links, each having an integrally formed unbroken or unsevered loop and an intermediate block link comprising a body provided with opposed laterally projecting bent extensions, each adapted for insertion into the unbroken loops of adjacent links, with the end of each extension so united with the body of the block link that it forms therewith substantially an integral structure.

ROBERT N. EVANS.

Witnesses:
F. E. BOYCE,
GEORGE S. PURCELL.